United States Patent [19]

Mouw

[11] Patent Number: 4,963,331

[45] Date of Patent: Oct. 16, 1990

[54] OZONE GENERATING TUBE

[76] Inventor: Kenneth W. Mouw, 2401 Oberlin Rd., Yreka, Calif. 96067

[21] Appl. No.: 485,175

[22] Filed: Feb. 26, 1990

[51] Int. Cl.5 .............................................. B01J 19/08
[52] U.S. Cl. ........................... 422/186.18; 422/186.07; 422/186.19; 204/176; 250/428
[58] Field of Search ...................... 422/186.18, 186.19, 422/186.07; 204/176; 250/428

[56] References Cited

U.S. PATENT DOCUMENTS

| | | | |
|---|---|---|---|
| 3,996,474 | 12/1976 | Lowther | 250/532 |
| 4,013,567 | 3/1977 | Emelyanov et al. | 250/540 |
| 4,062,748 | 12/1977 | Imris | 204/176 |
| 4,159,971 | 7/1979 | Gnevpel | 250/540 |
| 4,417,966 | 11/1983 | Krass et al. | 204/176 |
| 4,764,349 | 8/1988 | Arff et al. | 422/186.18 |
| 4,908,189 | 3/1990 | Staubach | 422/186.19 |

Primary Examiner—Stephen J. Lechert, Jr.
Assistant Examiner—Nina Bhat
Attorney, Agent, or Firm—Eugene M. Eckelman

[57] ABSTRACT

A sealed glass tube having an electrical conductor therein arranged when combined with a high voltage and an encircling perforated metal member on the tube to produce ozone. The tube has an electrically conducting cap fitted on and integrally secured to one end thereof, and an externally threaded adapter is mounted on the cap for quick attachment to and detachment from an ozone generator manifold. The conductor has a projecting end secured to an outer end wall of the cap, and such wall in turn has a lug attached thereto providing quick attachment to a source of high voltage.

5 Claims, 1 Drawing Sheet

U.S. Patent
Oct. 16, 1990
4,963,331
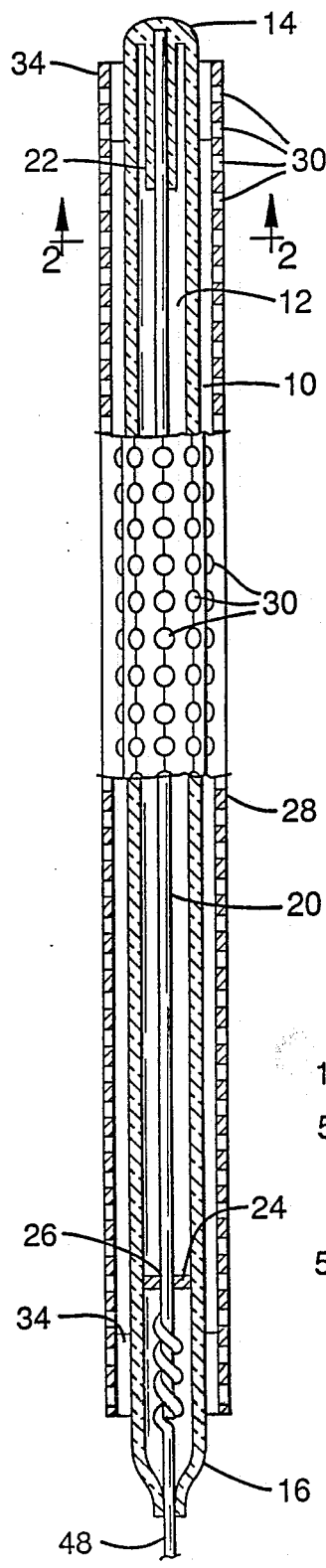
FIG. 1
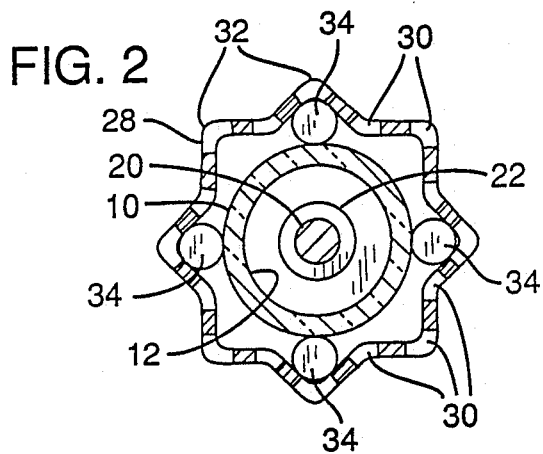
FIG. 2
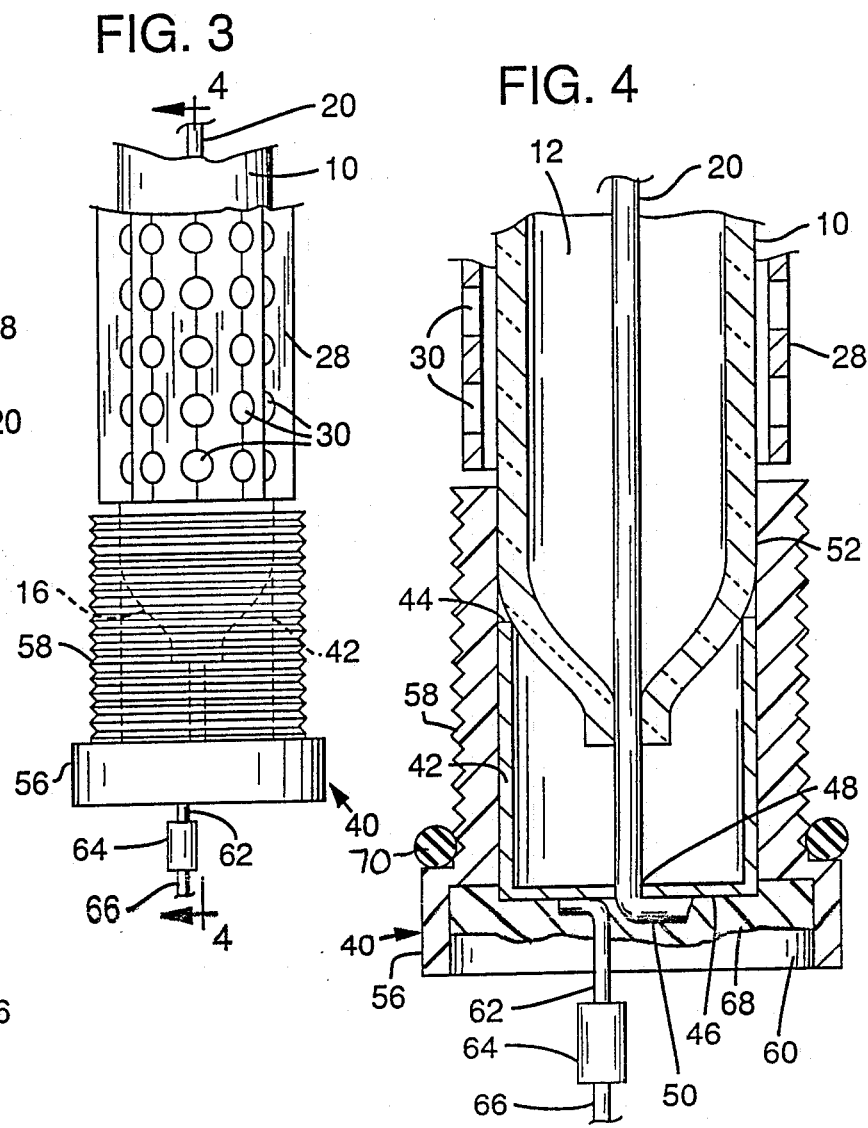
FIG. 3
FIG. 4

OZONE GENERATING TUBE

BACKGROUND OF THE INVENTION

This invention relates to new and useful improvements in ozone generating tubes.

Ozone generators or manifolds frequently utilize glass tubes surrounded by a metal grid, whereby with the glass tubes filled with a gaseous substance and a high voltage applied to the interior of the tube, the combination of the tube and grid provide a condensing action to produce heavy oxygen or ozone for treating air, water, etc. A desirable feature of the tubes is that they operate efficiently whereby to produce maximum ozone from minimum voltage input. A further feature desired is that the tubes be long lasting and capable of withstanding the high voltage input. It is also a desirable feature that the tubes be simplified and inexpensive in construction and provide simplified factory and field assembly. Prior devices have been conceived, such as shown in U.S. Pat. No. 4,764,349, but such devices do not possess all the above desired features.

SUMMARY OF THE INVENTION

According to the present invention and forming a primary objective thereof, an ozone generating tube is provided which amounts to an improvement over prior devices.

Other objects of the invention are to provide a device of the type described having a structure which provides maximum ozone protection with a minimum of high voltage input, that is capable of resisting damage due to relative expansion and contraction of the parts as well as being highly resistant to electrode junction oxidation as well as to physical abuse, to provide a connecting end of the tube that facilitates factory and field assembly, and that is simplified in construction and inexpensive to manufacture.

In carrying out the above objectives, a sealed glass tube is provided having a gaseous filling which when subjected to high voltage produces a radiation of energy through the wall of the tube. An elongated electrical conductor is mounted lengthwise in the tube and extends through a major portion of the tube. An encircling fluted perforated grid surrounds the tube to produce ozone. Means are supported on the grid for concentrically locating the tube therein. The glass of the tube comprises a glass treated for resistance to heat. The tube is held concentrically within the grid by spacers secured in the flutes of the grid adjacent opposite ends and has a brass cap that provides protection for the exiting electrical conductor tube from outer exposure and corrosion. This brass cap also has means providing simplified connection to an input or bias wire. Also provided on this end of the tube is a male adapter that is formed of an ozone resistant plastic and that has an exteriorly threaded shank for fast threaded connection to ozone generators or manifolds. This adapter also serves to isolate areas where the ozone is produced from the area in which the input wire is connected to the electrical conductor of the tube.

The invention will be better understood and additional objects and advantages will become apparent from the following description taken in connection with the accompanying drawings.

BRIEF DESCRIPTION OF THE DRAWINGS

FIG. 1 is an elevational view of a basic ozone generating tube with which the present invention is to be combined.

FIG. 2 is an enlarged cross sectional view of the tube taken on the line 2—2 of FIG. 1.

FIG. 3 is an enlarged fragmentary view of the tube showing the present invention mounted thereon; and FIG. 4 is a sectional view taken on the line 3—3 of FIG. 2.

DETAILED DESCRIPTION OF A PREFERRED EMBODIMENT

With reference to the drawings, the ozone generating tube of the present invention comprises a glass tube 10 having a gas filled interior 12 sealed at the ends 14 and 16. The end 16 comprises an input end and has a wire-type conductor 20 which passes through it and which extends substantially the entire length of the tube. It is held in place by the closed end 16 and a cylindrical socket 22 integral with the end 14 of the tube and open toward the end 16 for receiving the end of the conductor. As an optional structure, discs 24 are selectively located along the conductor and have a central bore 26 slidably receiving the conductor 20 for holding it centered within the tube. These discs are constructed of glass so as not to cause plating on the interior of the tube. The discs and the socket 22 support the conductor in an axial position but allow the tube to adjust axially therein to prevent forces due to expansion and contraction from building up in the tube.

Tube 10 is contained within a grid or sleeve 28 having a plurality of perforations 30. This grid is constructed of an electrically conductive material such as stainless steel and has V-shaped flutes 32, best seen in FIG. 2, extending longitudinally thereof. These flutes extend the full length of the grid.

Tube 10 is supported interiorly of the grid by cylindrical spacers 34 secured in the inner facing grooves of the flutes 32. The outer diameter of the tube 10 is smaller than the inner diameter of the grid and the spacers 34 have a diameter which frictionally receives the tube and holds it in place in precise concentric but spaced relation within the grid. This spacing allows ample room for air to move through between the tube and the grid. Spacers 34 are short in length such as ½ inch or less and are located in alternate inwardly facing grooves of the flutes so as to efficiently allow for end inlet and outlet of the circulating air.

The conductor 20 is constructed of a material, such as tungsten or stainless steel or other material that will not disintegrate under high voltage and furthermore has a somewhat similar coefficient of expansion as the glass of the tube to provide balanced forces of expansion and contraction.

With particular reference to FIGS. 3 and 4, the electrical input end of the tube has a head portion 40 forming a closure for the tube as well as a mount for quick attachment to and detachment from an ozone generator or manifold, not shown. The head portion 40 comprises a brass cap 42 having an open end 44 which fits down over the input end of the tube. This cap has a closed end 46 with a bone 48 through which an end portion 50 of the conductor 20 projects. This conductor end portion 50 is bent over against the outer surface of the cap end 46 and is soldered integrally in place to provide a good electrical connection. The cap is glued integrally to this end of the tube with an ozone resistant adhesive 52.

Integrally secured to the exterior end surface of the brass cap 42 is a male adapter 56 having an exteriorly threaded shank portion 58 secured integrally to the exterior surface of the brass cap 42, as by a suitable adhesive. This adapter has an open upper end 60.

Secured to the closed end 46 of the cap 42, as by soldering, is a short spade lug 62 arranged to be secured in an electrically conducting sleeve connector 64 in turn electrically connected to a high voltage lead or bias wire 66. The conductor end portion 50 and the connected end of the spade lug 62 are covered with an insulating compound 68 in the open end 60 of the male adapter. An O-ring 70 is mounted on the threaded side of the adapter 56 to provide a sealed engagement with a support manifold to which the tube is to be secured.

In accordance with the present invention, the brass cap provides protection to the external conductor wire 20 from both exposure to corrosive properties of ozone and damage from handling. The smooth outer surface of this cap provides an elongated surface area for adhering the plastic male adapter thereto. The right angle spade lug 62 provides an easy means of connecting the bias wire 66 to the tube. This in turn reduces manufacturing time as well as providing a simple means of performing field maintenance.

The threaded male adapter 56 allows for quick attachment or detachment of the tube relative to the generator. This threaded feature enhances both factory and field assembly. Also, the adapter 56 serves to isolate the area where the ozone is produced from the area in which the bias connection is made to the tube conductor 20. This isolation prevents oxidation and corrosion of the connecting wires as well as decreasing the incidence of electrical shorting between the two bias points.

The conductor 20 is compatible in its sealing connection with the glass to provide a good seal at the end 16 when the glass is molded around the conductor. The tube structure and head portion provide an inexpensive tube and one which comprises an improvement over prior devices.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. Ozone generating means comprising
    a sealed glass tube having forward and rearward ends and also having a gaseous filling which when subjected to high voltage produces a radiation of energy through the wall of the tube,
    an elongated electrical conductor disposed lengthwise in said tube and having forward and rearward ends,
    said forward end of said conductor having a projecting end in sealed relation with the forward end of said tube and arranged for connection to a source of high voltage,
    said conductor extending axially in said tube whereby to subject said gaseous filling to high voltage and provide electrical communication to the exterior of the tube,
    an encircling perforated grid surrounding said tube and being arranged to form a shield for energy radiating from said tube to produce ozone,
    said grid comprising a metal member larger in diameter than said tube whereby the inner diameter thereof is larger than the outer diameter of said tube to form a space therebetween,
    an electrically conducting cap having an open end receiving a forward end of said tube and being integrally secured thereto,
    and a male adapter integrally mounted on said cap arranged to threadedly attach said tube to and detach it from an ozone generator manifold.

2. The ozone generating means of claim 1 wherein said male adapter is fitted on said cap and adhesively secured thereto.

3. The ozone generating means of claim 1 wherein said cap has an outer closed end, a bore in said closed end, the projecting end of said conductor being secured to said closed end in an electrical connection, and electrically conducting lug means electrically connected to said closed end and arranged for connection to a source of high voltage.

4. The ozone generating means of claim 1 wherein said male adapter has a cup-shaped end portion projecting beyond said closed end of said cap for protecting the connected projecting end of said conductor and the connected lug means.

5. Ozone generating means comprising
    a sealed glass tube having forward and rearward ends and also having a gaseous filling which when subjected to high voltage produces a radiation of energy through the wall of the tube,
    an elongated electrical conductor disposed lengthwise in said tube and having forward and rearward ends,
    said forward end of said conductor having a projecting end in sealed relation with the forward end of said tube and arranged for connection to a source of high voltage,
    said conductor extending axially in said tube whereby to subject said gaseous filling to high voltage and provide electrical communication to the exterior of the tube,
    an encircling perforated grid surrounding said tube and being arranged to form a shield for energy radiating from said tube to produce ozone,
    said grid comprising a metal member larger in diameter than said tube whereby the inner diameter thereof is larger than the outer diameter of said tube to form a space therebetween,
    means connecting the projecting end of said conductor with an inlet source of high voltage,
    means isolating the connection of said conductor and inlet source of high voltage from the ozone producing portion of the tube.

* * * * *